United States Patent
Maier-Laxhuber et al.

[11] Patent Number: 5,482,541
[45] Date of Patent: Jan. 9, 1996

[54] SORPTION CARTRIDGE

[75] Inventors: Peter Maier-Laxhuber, Unterschleissheim; Andreas Becky; Reiner Engelhardt, both of München; Gerald Heggl, Inning, all of Germany

[73] Assignee: Zeo-Tech GmbH, Unterschleissheim, Germany

[21] Appl. No.: 171,110

[22] Filed: Dec. 21, 1993

[30] Foreign Application Priority Data

Dec. 23, 1992 [DE] Germany .................. 42 43 816.0

[51] Int. Cl.⁶ .................................................. B01D 53/04
[52] U.S. Cl. ........................ 96/146; 96/149; 96/151; 55/274; 55/515
[58] Field of Search ........................ 95/114, 115, 120, 95/121, 126, 148; 96/143, 146, 149, 151; 55/274, 275, 512, 513, 515, 518, 519

[56] References Cited

U.S. PATENT DOCUMENTS

| | | | |
|---|---|---|---|
| Re. 30,682 | 7/1981 | Bush | 55/512 X |
| 2,758,719 | 8/1956 | Line | 55/513 X |
| 3,103,425 | 9/1963 | Meyer | 95/115 |
| 3,264,803 | 8/1966 | Read | 96/146 |
| 3,335,550 | 8/1967 | Stem | 96/146 X |
| 3,353,339 | 11/1967 | Walter | 55/512 X |
| 3,505,783 | 4/1970 | Graham | 55/275 X |
| 3,568,406 | 3/1971 | Dynes | 95/115 |
| 3,705,480 | 12/1972 | Wireman | 55/275 X |
| 3,785,164 | 1/1974 | Wrenn, Jr. | 96/149 X |
| 4,015,959 | 4/1977 | Grote | 55/515 X |
| 4,094,652 | 6/1978 | Lowther | 95/121 X |
| 4,273,621 | 6/1981 | Fornoff | 95/114 X |
| 4,636,225 | 1/1987 | Klein et al. | 95/120 |
| 4,714,485 | 12/1987 | Covert et al. | 96/143 |
| 5,034,039 | 7/1991 | Goddard | 96/151 |
| 5,035,065 | 7/1991 | Parkinson | 95/120 X |
| 5,147,419 | 9/1992 | Schoofs et al. | 95/126 X |
| 5,160,355 | 11/1992 | Toppel | 96/146 |
| 5,271,762 | 12/1993 | Schoofs et al. | 95/115 X |

FOREIGN PATENT DOCUMENTS

| | | | |
|---|---|---|---|
| 0043996 | 1/1982 | European Pat. Off. | 95/126 |
| 1040686 | 10/1953 | France | 55/512 |
| 2304990 | 8/1973 | Germany | 55/513 |
| 2854710 | 7/1980 | Germany | 96/146 |
| 0256726 | 5/1988 | Germany | 95/120 |
| 0261744 | 11/1988 | Germany | 95/143 |
| 61-216711 | 9/1986 | Japan | 96/143 |
| 0044399 | 9/1927 | Norway | 55/512 |
| 0990230 | 4/1965 | United Kingdom | 95/148 |

*Primary Examiner*—Robert Spitzer
*Attorney, Agent, or Firm*—Hoffmann & Baron

[57] ABSTRACT

Adsorption agent cartridge includes a vacuum tight cover having an adsorption agent filler consisting of a substance which can adsorb operating medium steam. The adsorption agent cartridge further includes an inlet opening for the inflow of the operating medium steam and an exhaust opening, which preferably connects to an exhaust device, for expelling air and nonadsorbed gases from the adsorption agent filler. The adsorption agent filler is designed to adsorb the operating medium steam and not to adsorb air components. The exhaust opening and the inlet opening are so arranged with respect to the adsorption agent filler such that the non-adsorbed gases are expelled from the regions of the adsorption agent filler without the concurrent removal of the inflowing operating medium steam.

10 Claims, 2 Drawing Sheets

SORPTION CARTRIDGE

BACKGROUND OF THE INVENTION

1. Field of the Invention

The present invention relates to adsorption apparatus cartridges, and more particularly relates to an adsorption cartridge having adsorption agent filler therein for adsorption of operating medium steam.

2. Description of the Prior Art

In the field of sorption technology, there are differences between absorption and adsorption apparatus. Specifically, one difference is evident in that adsorption apparatus utilize solid adsorption materials. Adsorption apparatus are known to operate as either closed systems or open systems. When utilizing either type of system, the operating medium is exothermally absorbed by an adsorption agent. As a result, the operating medium steam source which provides the operating medium is cooled due to the evaporation of the operating medium. Since both the closed and open systems operate during the adsorption phase without air, system pressure is provided by the evaporation pressure of the operating medium. In contrast to open systems, closed systems operate without the presence of air even after desorption of the operating medium. However, semi-open systems desorb operating medium in air atmosphere.

Known open and closed systems use these adsorption techniques for generating both heat and cold. In order to generate the heat or cold, adsorption filler is contained in an adsorption container which is in contact with the operating medium steam source. In order to regulate the flow of operating medium steam, a valve is typically provided between the adsorption filler and the steam source so as to prevent the adsorption reaction in the closed condition. When the valve is opened and if a sufficient vacuum pressure is provided, operating medium steam will flow into the adsorption filler. However, if a sufficient vacuum pressure is not present, the air contained within the system will prevent a rapid adsorption reaction.

Closed adsorption systems are relatively inflexible because they require the presence of a permanent vacuum for operation. Since the adsorption filler and the steam source must be fixedly connected with each other and are therefore not exchangeable, closed apparatuses have relatively limited applications. In contrast, semi-open systems are substantially more flexible, since a simple exchange between the steam source and the adsorption container is possible.

OBJECTS AND SUMMARY OF THE INVENTION

It is an object of the present invention to design an adsorption agent cartridge which permits a relatively quick and simple exchange within a currently operating adsorption system.

It is another object of the present invention to provide an adsorption agent cartridge which overcomes the inherent disadvantages of known adsorption containers.

In accordance with one form of the present invention, an adsorption agent cartridge includes an air-tight cartridge cover and adsorption agent filler which is capable of adsorbing operating medium steam. The cartridge cover also includes an inlet opening for providing operating medium steam and an exhaust opening which is preferably coupled to an exhaust device for withdrawing gases from the adsorption agent cartridge which are not adsorbed by the adsorption agent filler. The adsorption agent cartridge can selectively expel non-adsorbed gases through the exhaust opening. Preferably, the exhaust opening and the inlet opening are configured such that the non-adsorbed gases will be expelled from the adsorption agent filler while the operating medium steam will substantially remain within the adsorption agent filler.

These and other objects, features and advantages of the present invention will be apparent from the following detailed description of illustrative embodiments thereof, which is to be read in connection with the accompanying drawings.

DETAILED DESCRIPTION OF THE PREFERRED EMBODIMENTS

Figure 1:
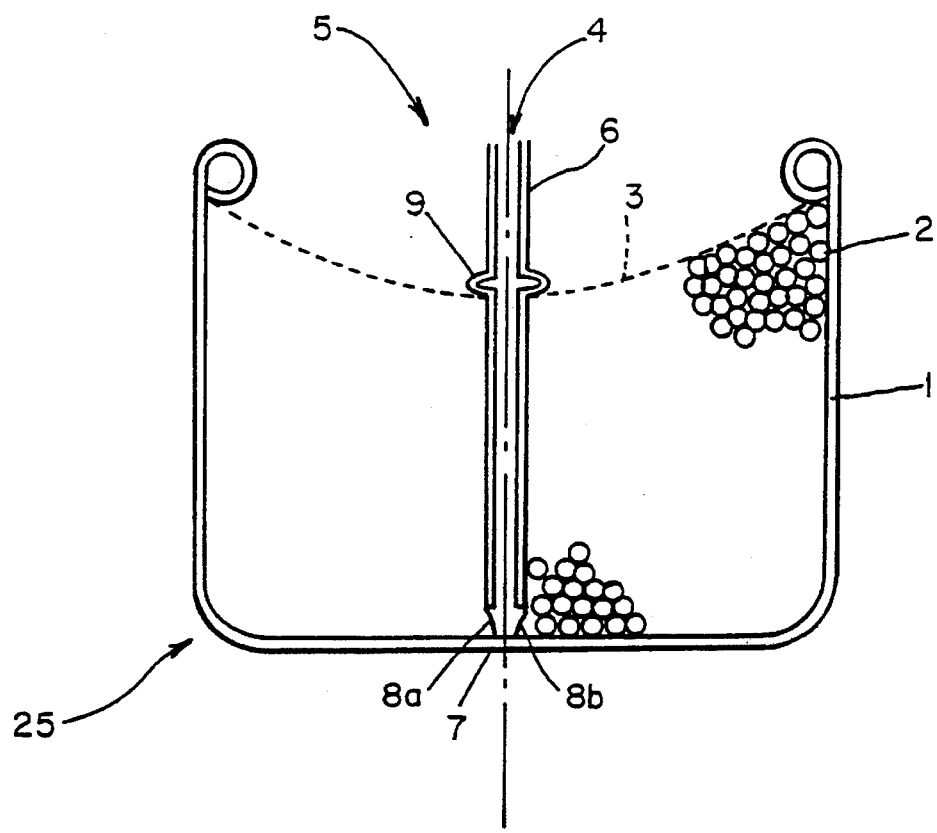
FIG. 1 is a cross-sectional view of an adsorption agent cartridge constructed in accordance with a first form of the present invention.

Referring now to FIG. 1 of the drawings, an adsorption agent cartridge for use with a sorption system constructed in accordance with the present invention will now be described. The adsorption agent cartridge 25 preferably includes a metallic cartridge cover 1 which contains adsorption agent filler 2 which is only partially shown in the figure. The adsorption agent filler 2 is held in place within the adsorption agent cartridge by means of a screen 3. The screen is primarily held in place within cartridge cover 1 by shoulder 10. An exhaust opening 4 extends through an entry opening 5. The entry opening 5 is formed by an opening of the cartridge cover 1. The exhaust opening 4 is formed by a first end of the exhaust pipe 6 which extends through entry opening 5. The exhaust pipe 6 includes a second end 7 which is secured to the cartridge cover 1. Openings 8a, 8b are provided on the second end 7 of the exhaust pipe. Air and nonadsorbed gases are expelled from the adsorption agent filler 2 by entering openings 8a and 8b of exhaust pipe 6 and by exiting exhaust opening 4. The screen 3 of the adsorption cartridge is stabilized by a shoulder 9 included on the exhaust pipe which contacts and supports the screen.

Figure 2:
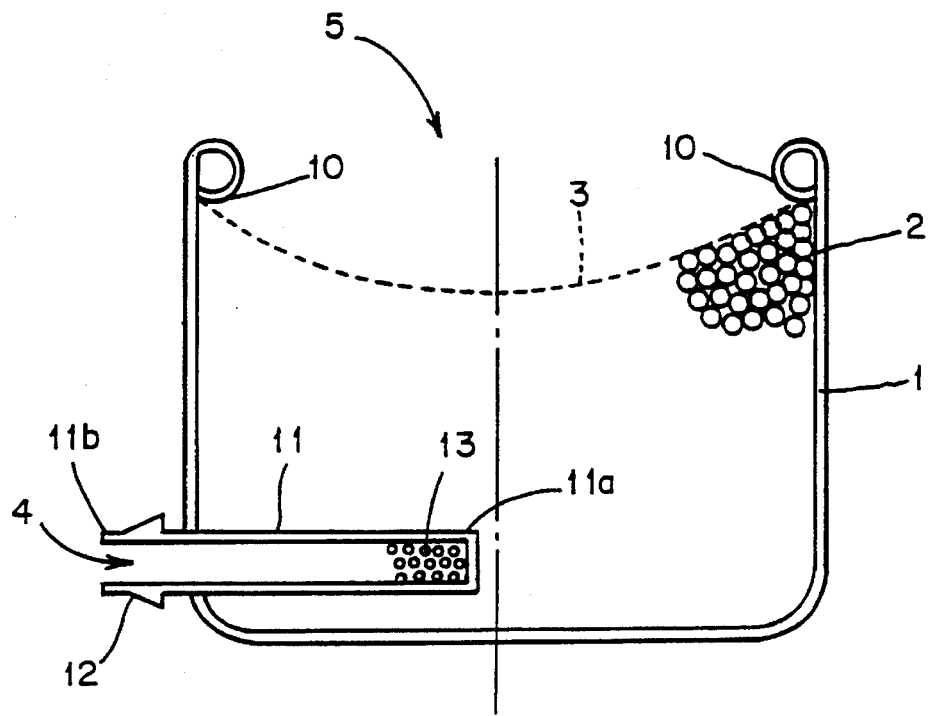
FIG. 2 is a cross-sectional view of an adsorption agent cartridge constructed in accordance with a second form of the present invention.

Referring now to FIG. 2, the adsorption agent cartridge 25 constructed in accordance with a second embodiment of the present invention also includes cartridge cover 1 and adsorption agent filler 2. A screen 3 is fixed on shoulder 10 of inlet opening 5. A suction pipe 11 having first and second ends 11a, 11b extends in a vacuum tight manner out of the cartridge cover 1. The suction pipe 11 also includes on the second end 11b, a mounting 12 for attachment to a hose or similar device. The first end 11a of the suction pipe 11 contains a plurality of openings 13 through which air and nonadsorbed gases can be provided from the adsorption agent filler 2 to the suction pipe 11 for expulsion from the adsorption agent cartridge 25.

Figure 3:
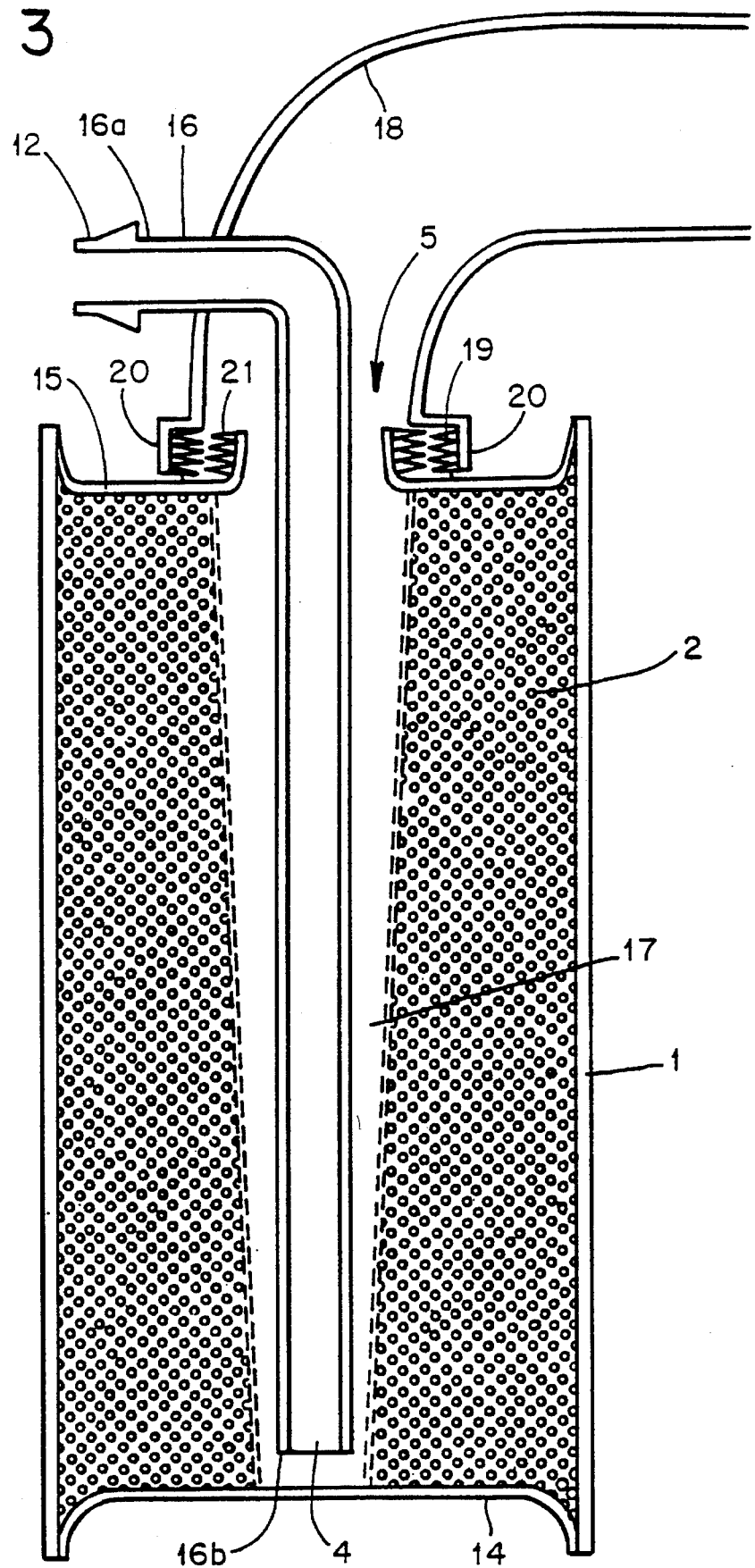
FIG. 3 is a cross-sectional view of an adsorption agent cartridge in accordance with a third form of the present invention.

Referring now to FIG. 3, an alternative embodiment of the adsorption agent cartridge 25 is shown as including a bottom 14 and a lid 15 secured onto front faces of the cartridge cover 1 which, in the embodiment of FIG. 3, is cylindrical. The lid 15 includes an inlet opening 5 through which a suction pipe 16 extends therethrough into the adsorption agent filler 2.

The suction pipe includes first and second ends 16a, 16b. The first end 16a of the suction pipe is positioned outside the cartridge cover 1 and the second end 16b is disposed inside the cartridge cover. The second end 16b of the suction pipe 16 preferably discharges at a point proximate to the bottom of the adsorption agent cartridge within an inner flow conduit 17. The first end 16a of the suction pipe 16 also includes connecting means 12 for coupling the suction pipe 16 to an exhaust device (not shown). The inlet opening 5 is equipped with a threaded portion 21 with which the total adsorption agent cartridge can be secured to an operating medium steam line 18. The operating medium steam line 18 provides operating medium steam from an operating medium steam source (not shown) to the adsorption agent cartridge. A counterthread 19 located at an end of the operating medium line 18 proximate to the cartridge cover is provided with a circumferential seal 20 with which the adsorption agent cartridge can be vacuum tight coupled to the operating medium steam line 18.

With the above description in mind, the adsorption cartridge and the operation of the same will be described in more detail. The adsorption agent cartridge 25 of the present invention is an airtight device including an airtight cartridge cover for containing an adsorption agent filler. As described in connection with the drawings, the cover 1 has an entry opening 5 for providing operating medium steam and an exhaust opening 4 for expelling air and nonadsorbed gases. In a preferred embodiment, the entry opening 5 and exhaust opening 4 are arranged with respect to the adsorption filler such that operating medium steam is adsorbed by the adsorption filler in an unimpeded manner while nonadsorbed gases are simultaneously expelled.

Preferably, the exhaust opening 4 is positioned within the adsorption cartridge so that the exhaust opening is substantially opposite the location of the entry opening 5. As a result, air and nonadsorbed gases are exhausted from the adsorption agent filler, without imbedding the flow of operating medium steam into the adsorption agent filler.

The operating medium steam which is provided to the cartridge cover is first adsorbed by the adsorption agent that is proximate to the entry opening 5 of the cartridge cover. When the adsorption agent proximate to the entry opening is saturated with operating medium steam, additional operating medium steam that is provided will push operating medium steam to more remotely located regions of the adsorption agent. This "zone-like" flow of the operating medium steam is assured if air and nonadsorbed gases are expelled from the adsorption agent through the exhaust opening 4. After substantially all of the adsorption filler is saturated with the operating medium, a so-called "penetration" of the operating medium steam flow through the filler occurs. Thereafter, as additional operating medium steam is provided to the adsorption system, the operating medium steam is expelled through the exhaust opening. However, if the exhaust opening is located in close proximity to the entry opening, then some operating medium steam would be expelled from the adsorption container before the adsorption agent is substantially saturated with operating medium. Therefore, the air which is present in the adsorption agent in the more remote regions of adsorption agent filler would not be properly expelled.

In order to maintain the capacity of the adsorption filler and in order to have a relatively low exhaust device operating time, the present invention includes an adsorption material which readily adsorbs operating medium steam and which does not significantly adsorb air molecules. If an adsorption substance is utilized which is capable of adsorbing nitrogen and oxygen molecules in addition to operating medium steam, air would be preadsorbed during storage of the adsorption agent cartridge. The operating medium steam would desorb the preadsorbed gases since water molecules have a stronger affinity for adsorption by the zeolite than the preadsorbed gas molecules. These preadsorbed gases which are released during the adsorption reaction should then be permanently exhausted.

In accordance with a preferred form of the present invention, the adsorption agent cartridge is filled with a zeolite of the 3-A-type. This type of zeolite has the characteristic of adsorbing water vapor (operating medium) molecules and adsorbing relatively few air components. Therefore, when using a 3-A-type adsorption agent cartridge, only the air between the absorption agent crystals must be expelled and an expulsion of desorbed air components is not required. In accordance with a preferred form of the present invention, the adsorption agent cartridge can be utilized in sorption systems that are evacuated with the aide of a manually driven vacuum pump.

In accordance with a preferred form of the invention, the adsorption filler consists of a substance which is generally commercially available in rod or granular form. Preferably, the diameter of the particles of the granules should be larger than 1 mm because particles of a smaller diameter generate a high internal pressure as compared to that of the inflowing operating medium which would prevent quick adsorption of the inflowing operating medium.

When the adsorption agent filler is in granular form, it is preferable to secure the granulate in the cartridge cover with a screen such as screen 3 shown in FIGS. 1 and 2. With this configuration, the operating medium steam can flow through the screen, while the granulate is simultaneously prevented from falling out of the cartridge. It is particularly advantageous if the screen is detachable from the cartridge cover so that an exchange of the adsorption filler can be facilitated.

It has been shown to be relatively advantageous to use a solid structure which is inserted into the cartridge cover in a paste-like shape and which solidifies during a drying process. In order to achieve a sufficient adsorption rate of operating medium adsorption, it is preferable to provide the solid filler structure with suitable flow conduits for permitting a flow of operating medium. Preferably, the flow conduits couple the inlet opening to the exhaust opening. The diameter of the flow conduit and number of flow conduits correspond to the specific requirements of the absorption system.

It is advantageous to admix the adsorption filler with a substance that provides an optical indication of the amount of operating medium that has been adsorbed by the adsorption medium (i.e., charge condition). If the operating medium indicator substance is provided proximate to the exhaust opening, an indication as to when a replacement cartridge is required is evident when the color of the adsorption filler changes. Other types of sensors, such as electronic devices, have been shown to also provide an indication as to the proper time for replacement of the adsorption agent cartridge. The electronic sensor devices are particularly advantageous with adsorption systems which operate automatically when needed.

As soon as the adsorption filler is saturated with operating medium, the adsorption agent cartridge must be replaced with regenerated (unsaturated) filler. This could occur by replacing the filler in the saturated cartridge with an unsaturated (new) zeolite filler or, in the alternative, the saturated filler can be regenerated by heating the same. In relatively simple cases, it is sufficient to regenerate the filler in the adsorption cartridge by heating. The regeneration basically includes placing the adsorption agent and the metallic cover in a heating chamber until all adsorption agent zones have reached a temperature sufficient for desorption (at least 200° C. if zeolite is utilized). For certain adsorption agent fillers, the heating temperatures required for regeneration may have to exceed 300° C.

During the heating of the adsorption agent cartridges, the previously adsorbed operating medium steam is expelled from the filler to the air in the surrounding environment. Ammonia and alcohol are not suitable operating medium if regeneration of the filler is to occur in this manner. Ammonia and alcohol are better suited for use in a closed-system.

In a preferred embodiment of the present invention and specifically when relatively large adsorption agent cartridges are utilized, an electric heater is installed within the adsorption filler for regeneration of the filler. If this arrangement is utilized, it is recommended to incorporate a thermostat with the heater in order to prevent an overheating of the adsorption filler.

When exchanging or replacing an adsorption agent cartridge from an adsorption system, typically two connections must be manipulated. First, the entry opening from the steam source and second the exhaust opening to the exhaust device. In accordance with a preferred embodiment of the present invention, these two openings may be included within a single connector coupled to the adsorption agent cartridge. Since the exhaust opening usually has a smaller diameter than that of the inlet opening, it is advantageous to feed the exhaust opening through that of the inlet opening. This can be done in at least two ways. In a first embodiment, an exhaust tube is fixed within the adsorption agent cartridge in such a manner that the exhaust tube inlet is located at an end of the adsorption agent filler opposite to that of the introduction of operating medium steam. In a second embodiment, the exhaust tube is not coupled to the cartridge. Instead, the exhaust tube remains coupled to a connection adapter during the replacement of the cartridge. The connection adapter couples the inlet opening to the steam source and, preferably, a conduit is provided in the adsorption filler for acceptance of the exhaust tube. Since only a single connection must be detached and reattached in the above-described embodiments, a relatively rapid exchange of adsorption cartridges is possible. A further advantage of this configuration consists in that only the entry opening must be designed in a vacuum tight manner.

A significant number of bottle-like containers are suitable for use as adsorption agent cartridges as long as they have a sufficiently large opening for the intended purpose. Suitable connecting adapters for use in the present invention are known from beverage dispensing systems wherein the $CO_2$ supply as well as removal of beverage barrel contents is performed through a single adapter.

All seals for connecting the adsorption agent cartridge are connected with the connecting adapter to the adsorption system. As a result, the adsorption agent cartridge substantially includes only a cover with adsorption agent filler. It can therefore be economically manufactured, replaced and regenerated.

When utilizing adsorption agent cartridges which have a relatively high adsorption power, it is advantageous to provide additional heat exchangers for cooling the adsorption agent after the adsorption agent has adsorbed the operating medium steam. The heat exchangers may be heat guiding sheet metal in the outer range of the cartridge cover or pipe lines for heat adsorbing media within the adsorption agent filler. Liquids, such as water or consumable beverages, that it is desirable to heat, are particularly suitable as heat absorbing medium.

Although illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

What is claimed is:

1. Adsorption agent cartridge comprising an airtight cartridge cover and an adsorption agent capable of adsorbing operating medium, the adsorption agent cartridge also including an operating medium line and an inlet opening, the operating medium line being in fluid communication with the inlet opening for accepting an inflow of said operating medium, the adsorption agent cartridge also including a suction tube having an exhaust opening within the adsorption agent, the inlet opening being substantially larger than the exhaust opening, said suction tube providing a conduit through which gases from said adsorption agent cartridge that are not adsorbed by said adsorption agent are expelled from the adsorption agent cartridge, the suction tube being at least partially contained within the operating medium line and being substantially positioned through said inlet opening such that the exhaust opening is distantly located with respect to the inlet opening wherein said exhaust opening and said inlet opening are configured such that the nonadsorbed gases will be expelled from said adsorption agent and said operating medium will substantially remain within said adsorption agent.

2. Adsorption agent cartridge as defined by claim 1, wherein said adsorption agent consists of adsorption agent granules having a diameter of at least 1 mm.

3. Adsorption agent cartridge as defined by claim 1, wherein said adsorption agent consists of a substantially solid unit contained within said adsorption agent cartridge, said adsorption agent cartridge having flow conduits which substantially extend from said inlet opening to said exhaust opening.

4. Adsorption agent cartridge as defined by claim 1, wherein said adsorption agent includes indicator means which substantially denote an amount of operating medium adsorbed by the adsorption agent.

5. Adsorption agent cartridge as defined by claim 1, further comprising heating means substantially contacting said adsorption agent, the heating means substantially heating said adsorption agent so as to desorb said operating medium from said adsorption agent.

6. Adsorption agent cartridge as defined by claim 1, wherein one of said airtight cartridge cover and said adsorption agent include said flow conduits, said flow conduits creating a zone-like charge front within said adsorption agent, said zone-like charge front being defined by first and second regions of said adsorption agent, the first region having adsorbed operating medium and the second region being substantially free of operating medium, the zone-like charge front of said first region substantially migrating from said inlet opening toward said exhaust opening as operating medium is adsorbed by said adsorption agent.

7. Adsorption agent cartridge as defined by claim 6, wherein said exhaust opening substantially discharges gases that are not adsorbed by said adsorption agent which are contained within said adsorption agent cartridge, said inlet opening is substantially the only opening of said cartridge cover.

8. Adsorption agent cartridge in accordance with claim 7, wherein said exhaust opening includes a tube, said tube being substantially positioned through said inlet opening and into said adsorption agent, said tube having first and second ends wherein said first end is substantially located within said second region of said adsorption agent such that the nonadsorbed gases are expelled from said adsorption agent.

9. Adsorption agent cartridge as defined by claim 1, wherein said exhaust opening substantially discharges gases that are not adsorbed by said adsorption agent which are contained within said adsorption agent cartridge, said inlet opening is substantially the only opening of said cartridge cover.

10. Adsorption agent cartridge as defined by claim 1, wherein said cartridge cover is provided with a heat exchanger for transmitting heat generated by the adsorption of operating medium from said adsorption agent.

* * * * *